UNITED STATES PATENT OFFICE 2,416,536

COPOLYMERS OF ACROLEIN AND METHACROLEIN WITH ACRYLIC COMPOUNDS

Harry T. Neher, Bristol, and Charles F. Woodward, Abington, Pa., assignors to Röhm & Haas Company, Philadelphia, Pa., a corporation of Delaware No Drawing. Application May 26, 1942, Serial No. 444,548

6 Claims. (Cl. 260—73)

The present invention concerns new and useful products resulting from the copolymerization of acrolein and/or methacrolein with acrylic compounds, such as the acid, esters, nitrile, and amide. It also concerns processes whereby such products are formed.

Unsaturated aldehydes, such as acrolein and methacrolein form polymers which are of little or no value commercially. Such polymers possess a number of undesirable physical properties such as poor fusibility and inferior heat and light stability. The penetrating odor of acrolein, which is easily detectable in the polymeric material, can be eliminated only with difficulty and partial decomposition occurs when attempts are made to machine or mold such polymers.

We have found that a wide variety of useful polymeric materials may be obtained by the copolymerization of acrolein and/or methacrolein with acrylic acid, its esters, amides, and nitrile, and mixtures thereof. Our preferred copolymers are prepared from monomeric mixtures which contain less than 50% of the unsaturated aldehydes, although copolymers of mixtures containing a higher percentage of the unsaturated aldehydes may be produced in accordance with our invention.

New copolymeric products within the scope of our invention have high softening points and reduced thermoplasticity. They possess a relatively high degree of insolubility. The copolymers containing 10% or more of acrolein or methacrolein are vulcanizable with sulfur. Other unique properties will be discussed below.

The copolymers of acrylic acid, its esters, amides, nitrile, and mixtures thereof with acrolein, methacrolein, or mixtures of these unsaturated aldehydes have many unique properties and advantages. Some of these have already been indicated, including high softening points, reduced thermoplasticity, and resistance to organic solvents. A peculiar effect of the particular unsaturated aldehydes here used is to increase materially the ease with which polymerization of their mixtures with acrylic derivatives may be induced and performed. Some higher esters of acrylic acid, which cannot ordinarily be polymerized alone in emulsions, readily form copolymers with acrolein or methacrolein. Films of the new copolymers on leather possess a degree of adhesion which has heretofore been unknown and which makes possible the coating and finishing of leathers which must be wet before being shaped and applied to cover such objects as cameras, wooden heels, furniture, etc.

In accordance with our invention, acceleration of the copolymerization may be effected by employment of oxygen-containing polymerization catalysts, such as organic acid peroxides, for instance, benzoyl peroxide or benzoyl acetyl peroxides, which are particularly suitable when polymerization is carried out in organic solvents, and by employment of water soluble catalysts, for instance, hydrogen peroxide or sodium perborate and especially ammonium or alkali metal persulfates, which are particularly adaptable when polymerization is carried out in aqueous emulsions.

In most cases the copolymerization proceeds rapidly and smoothly at elevated temperatures but may be performed at much lower temperatures than would promote polymerization of the acrylic derivative alone. For polymerization in solvents the polymerization is most conveniently effected at the boiling point of the polymerization mixture although lower or higher temperatures under normal or elevated pressure may be used if desired. In the case of emulsion polymerization, the reaction usually proceeds smoothly at temperatures below 100° C. It is generally sufficient to maintain the polymerizing emulsion mixture at a temperature near or slightly above the boiling point of the unsaturated aldehyde.

Since one effect of the acrolein or methacrolein on the copolymers is to render them insoluble in organic solvents, those copolymers which contain any appreciable amount of aldehyde generally separate from solution as polymerization proceeds in solvents. The insoluble polymer usually separates as a gel which can be removed from the solvent by decantation of the latter or it can often be broken up into irregular gel-like particles and filtered off. Evaporation of the adhering and absorbed solvent leaves the pure copolymer.

This separation of the copolymer because of its insolubility is avoided when polymerization is effected in aqueous emulsion. For many types of application, for example, coatings and impregnations, these emulsions offer the most convenient method of applying the more insoluble polymers.

Polymerization in aqueous emulsions or dispersions give especially good yields of copolymers. Suitable dispersing or emulsifying agents include a long chain hydroxy sulfonate, sulfonated castor oil, or octyl phenoxy ethoxy ethoxy ethyl sodium sulfonate. In the case of emulsions or dispersions it is desirable to limit the amount of unsaturated aldehyde in the monomeric mixture to approximately 20% in order to increase the stability of such mixture. Precipitation of the solid copolymers can be accomplished by addition of hydrochloric acid or aluminum sulfate to the aqueous emulsions. This precipitation is facilitated by heating the emulsion or dispersion after addition of the precipitating agents.

The following examples further illustrate the nature of this invention, but the invention is not restricted to such examples.

Example 1.—A mixture consisting of 20 grams of acrolein, 86 grams of methyl acrylate (93%), 18 grams of a 25% solution of octyl phenoxy ethoxy ethoxy ethyl sodium sulfonate, 1.5 grams of ammonium persulfate, and 350 grams of distilled water was stirred and heated to 70° C. for one hour and then to 80° C. for two hours. The product was a stable white aqueous emulsion containing 20% polymer, representing a polymer yield of 84.8%.

Example 2.—A mixture consisting of 30 grams of methacrolein, 570 grams of ethyl acrylate (98.6%), 2.0 grams of potassium persulfate, 11.25 grams of a long chain hydroxy sulfonate, and 1500 grams of distilled water was emulsified by vigorous shaking. One-third of the emulsion was then heated to 80° C. while being efficiently stirred. The remaining two-thirds of the emulsion was then added to the heated portion over a period of one hour. The period of heating was two hours at 80° C., followed by two hours at 90° C. Efficient stirring was employed throughout the heating process. The yield was 98.9% of polymer in the form of a stable white aqueous emulsion containing 27.6% solid matter.

Example 3.—A mixture consisting of 18.8 grams of methacrolein, 56.2 grams of acrylonitrile, 2.0 grams of potassium persulfate, 0.75 grams of sulfonated castor oil (75%), and 425 grams of distilled water was heated for four and one-half hours at 70° C. while being efficiently stirred. One gram portions of potassium persulfate were added to the mixture 1½ hours and 4¼ hours after the polymerization was begun. The polymer precipitated as lumps during the polymerization. The precipitated polymer was filtered, washed with ethanol, and dried at 70° C. The polymer yield was 93.3% of theory.

Example 4.—A mixture consisting of 105 grams of acrylic acid, 35 grams of methacrolein, 560 grams of distilled water, and 5.6 grams of hydrogen peroxide was heated at 100° C. for 6 hours. A film prepared from the resulting polymer solution was hard, transparent, and brittle.

Example 5.—Two hundred grams of ethylene dichloride was heated in a bath maintained at 90–95° C. A mixture consisting of 50 grams of acrolein, 150 grams of methyl acrylate, 1.5 grams of acrylic acid and 0.1 grams of benzoyl peroxide was added to the refluxing ethylene dichloride at a uniform rate over a period of one hour. Five hundredths grams of benzoyl peroxide in 50 grams of ethylene dichloride was added 5 hours after the monomer had been added. The total heating period at 90–95° C. was 21 hours. The polymer separated as a gel during the course of the polymerization. The isolated polymer was also insoluble in a mixture of ethanol and ethylene dichloride.

By the same methods as illustrated above, copolymers may be prepared from acrolein and/or methacrolein with other acrylic ester than shown above, including butyl, hexyl, benzyl, octyl, isooctyl, dodecyl, cetyl, octadecyl, allyl, methallyl, etc. or mixtures of acrylic esters. There may also be used acrylamide, N-methyl acrylamide, etc., to form the copolymers of this invention.

We claim:

1. A copolymer consisting of 50% to 95% of a member of the group consisting of acrylic acid, its esters, amides, and nitrile, and from 5% to 50% of acrolein.

2. A copolymer consisting of 50% to 95% of a member of the group consisting of acrylic acid, its esters, amides, and nitrile, and from 5% to 50% of a member of the group consisting of acrolein and methacrolein.

3. A copolymer consisting of 50% to 95% of methyl acrylate and 5% to 50% of acrolein.

4. A copolymer consisting of 50% to 95% of methyl acrylate and 5% to 50% of methacrolein.

5. A copolymer consisting of 50% to 95% of ethyl acrylate and 5% to 50% of acrolein.

6. A copolymer consisting of 50% to 95% of ethyl acrylate and 5% to 50% of methacrolein.

HARRY T. NEHER.
CHARLES F. WOODWARD.

REFERENCES CITED

The following references are of record in the file of this patent:

UNITED STATES PATENTS

| Number | Name | Date |
| --- | --- | --- |
| 2,356,767 | Kropa | Aug. 29, 1944 |
| 2,326,736 | Adelson | Aug. 17, 1943 |
| 2,341,877 | Middleton | Feb. 15, 1941 |
| 2,312,193 | Richter | Feb. 23, 1943 |
| 2,332,896 | D'Alelio | Oct. 26, 1943 |
| 2,071,419 | Moss | Feb. 23, 1937 |
| 2,144,067 | Kranzlein | Jan. 17, 1939 |
| 2,264,034 | Allen | Nov. 25, 1941 |
| 2,310,961 | Kropa | Feb. 16, 1943 |

FOREIGN PATENTS

| Number | Country | Date |
| --- | --- | --- |
| 542,642 | British | Jan. 21, 1942 |

OTHER REFERENCES

Ellis: Chemistry of Synthetic Resins, vol. I, pp. 501 and 502 (1935).

Redtenbacher: Liebig's annalen; vol. 47, 1843, pp. 141–143, 260–67.